(12) United States Patent
Yasumoto

(10) Patent No.: US 9,785,029 B2
(45) Date of Patent: Oct. 10, 2017

(54) DISPLAY DEVICE

(71) Applicant: ALPINE ELECTRONICS, INC., Shinagawa-ku, Tokyo (JP)

(72) Inventor: Takashi Yasumoto, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 14/957,036

(22) Filed: Dec. 2, 2015

(65) Prior Publication Data

US 2016/0209684 A1    Jul. 21, 2016

(30) Foreign Application Priority Data

Jan. 17, 2015  (JP) .................................. 2015-007299
Aug. 21, 2015  (JP) .................................. 2015-164073

(51) Int. Cl.
| | |
|---|---|
| *G02F 1/137* | (2006.01) |
| *G02F 1/1333* | (2006.01) |
| *G02F 1/1343* | (2006.01) |
| *G02F 1/1337* | (2006.01) |
| *G02F 1/1335* | (2006.01) |
| *G02F 1/1347* | (2006.01) |

(52) U.S. Cl.
CPC ............ *G02F 1/137* (2013.01); *G02F 1/1337* (2013.01); *G02F 1/1347* (2013.01); *G02F 1/13338* (2013.01); *G02F 1/13439* (2013.01); *G02F 1/133512* (2013.01); *G02F 1/133528* (2013.01); *G02F 2001/13332* (2013.01); *G02F 2001/133567* (2013.01); *G02F 2203/62* (2013.01)

(58) Field of Classification Search
CPC ..................................................... G02F 1/1347
See application file for complete search history.

(56) References Cited

U.S. PATENT DOCUMENTS

| | | | |
|---|---|---|---|
| 5,220,442 A * | 6/1993 | Dingwall ............. | G02F 1/1347 349/187 |
| 2014/0293188 A1* | 10/2014 | Chen .................... | G09G 3/3426 349/65 |
| 2015/0002563 A1* | 1/2015 | Chen ........................ | G09G 3/36 345/697 |

FOREIGN PATENT DOCUMENTS

| | | |
|---|---|---|
| JP | 2006-220786 | 8/2006 |
| WO | WO2014/112525 | 7/2014 |

OTHER PUBLICATIONS

Extended European Search Report for EP 15 19 8232 dated Mar. 15, 2016, 5 pgs.

* cited by examiner

*Primary Examiner* — Dennis Y Kim

(74) *Attorney, Agent, or Firm* — Brinks Gilson & Lione

(57) ABSTRACT

A display device includes a liquid crystal display device that has a display area and a hidden area surrounding the display area; a liquid crystal shutter that is layered on the liquid crystal display device and has a first area corresponding to the display area and a second area corresponding to the hidden area; and a control unit that sets the first and second areas to a transparent state and an opaque state, respectively, when the display area is active, and sets the first and second areas to the opaque state when the display area is not active.

15 Claims, 8 Drawing Sheets

DISPLAY DEVICE

RELATED APPLICATION

The present application claims priority to Japanese Patent Application Numbers 2015-007299, filed Jan. 17, 2015, and 2015-164073, filed Aug. 21, 2015, the entirety of which are hereby incorporated by reference.

BACKGROUND

1. Field of the Invention

The present invention relates to a display device for displaying various kinds of information.

2. Description of the Related Art

Conventionally, a display device having a frame area around its display section is known (see, for example, JP 2006-220786 A). In the frame area of this display device, a light-shielding resin layer is provided on the backside of a surface glass substrate, thereby hiding various circuits provided under the light-shielding resin layer, such as a driver, from being exposed to the surface.

There is a problem with the above-described display device disclosed in JP 2006-220786 A in that, due to a structural difference between the display section and its surrounding frame area, they do not appear to be a uniform color in a strict sense as seen from the surface side when the display section is not active (i.e. the device for displaying various kinds of information on the display section is not powered on). There is a desire among some display device manufacturers for a display device in which the display section and the frame area are a uniform color when the display section is not active, and at the start of operation content to be displayed gradually emerges from a blank part (fade-in); and conversely, at the end of operation displayed content gradually disappears and ends in a blank state again (fade-out). However, until now, it has been physically difficult to make the display section and the frame area a uniform color, and the desire of manufacturers has not been able to be fulfilled.

The present invention has been devised in view of such circumstances, and an object of embodiments of the invention is to provide a display device capable of making a display area and its surrounding area a uniform color when the display area is not active.

SUMMARY

To solve the above-described problem, a display device according to the present disclosure includes: a displaying unit that has a display area and a hidden area surrounding the display area; a liquid crystal shutter that is layered on the displaying unit and has a first area corresponding to the display area and a second area corresponding to the hidden area; and a controlling unit that sets the first area and the second area to a transparent state and an opaque state, respectively, when the display area is active, and sets the first and second areas to the opaque state when the display area is not active.

Since the liquid crystal shutter is layered on the displaying unit and switches between the transparent and opaque states in conjunction with the display area of the displaying unit, the color of the display area in the opaque state can be exactly matched with that of the hidden area in the opaque state.

It is desirable that the liquid crystal shutter described above includes a liquid crystal, a pair of orientation films arranged to sandwich the liquid crystal, and a pair of transparent electrodes arranged to sandwich the pair of orientation films; the pair of transparent electrodes includes a pair of first electrodes corresponding to the first area and a pair of second electrodes corresponding to the second area; voltage at the same potential and voltage having a predetermined frequency and a predetermined potential difference are selectively applied across the pair of first electrodes; and the voltage at the same potential is always applied across the pair of second electrodes. Since the first or second electrodes extend over the entire surface of the liquid crystal shutter, the first and second areas may be configured to have the same structure and can give a uniform appearance, for example, in the way they reflect light when viewed from outside.

It is desirable that the first area included in the above-described liquid crystal shutter is divided into a plurality of division areas, and the controlling unit sets each of the division areas separately to the transparent state or the opaque state. Particularly, it is desirable that each of the plurality of division areas described above can be separately set to the transparent state or the opaque state regardless of the operating state of the display area. Thus, even when the display area is divided into a plurality of areas and the display state is set for each of the division areas separately, it is possible to exactly match the color of a subset of the division areas being not activated with the color of their surrounding areas.

It is also desirable that the liquid crystal shutter described above includes a liquid crystal, a pair of orientation films arranged to sandwich the liquid crystal, and a pair of transparent electrodes arranged to sandwich the pair of orientation films; the pair of transparent electrodes includes a plurality of pairs of first electrodes respectively corresponding to a plurality of division areas included in the first area and a pair of second electrodes corresponding to the second area; voltage at the same potential and voltage having a predetermined frequency and a predetermined potential difference are selectively and separately applied across each of the plurality of pairs of first electrodes; and the voltage at the same potential is always applied across the pair of second electrodes. Since the plurality of pairs of first electrodes and the pair of second electrodes extend over the entire surface of the liquid crystal shutter, the first and second areas may be configured to have the same structure and can give a uniform appearance, for example, in the way they reflect light, when viewed from outside. Furthermore, since two types of voltage (voltage at the same potential and voltage having a predetermined frequency and a predetermined potential difference) may be selectively applied across the plurality of pairs of first electrodes and the pair of second electrodes, respectively, the need for providing different arrangements for applying these voltages to correspond to the plurality of pairs of first electrodes and the pair of second electrodes is eliminated, thereby enabling a simplified configuration.

It is desirable that overcoat layers are formed between the above-described orientation films and the first and second electrodes, as well as between the first electrodes and the second electrodes. Particularly, it is desirable that the use of the overcoat layers can reduce a level difference and a difference in optical properties between where the first electrodes or second electrodes are provided and where they are not provided. This enables an entirely optically uniform structure of the electrodes and their surroundings.

It is desirable that the above-described liquid crystal shutter further includes a pair of polarizing plates arranged to sandwich the pair of transparent electrodes, and the respective transmission axes of the pair of polarizing plates are set at the same angle. This enables the liquid crystal shutter to become transparent or opaque by applying voltage on the liquid crystal.

It is desirable that the above-described displaying unit is a liquid crystal display device, and one of the pair of polarizing plates, which is located on the side near the liquid crystal display device, may also be used as one of another pair of polarizing plates included in the liquid crystal display device, which is located on the side near the liquid crystal shutter. Thus, the number of parts can be reduced by sharing a polarizing plate, which would otherwise be provided individually for the liquid crystal shutter and the liquid crystal display device. Furthermore, reducing the number of polarizing plates by one can increase the transmittance. Furthermore, when a liquid crystal display device is used as the displaying unit, the front surface of the liquid crystal shutter, including a section for shielding an area under which a driving circuit of the liquid crystal display device is located, can be made a uniform color with no boundary.

It is also desirable that the above-described displaying unit is a liquid crystal display device, the liquid crystal display device includes a backlight, and the transparency of the first area is variable. This enables the total dimming ratio in a combination of the liquid crystal display device and the liquid crystal shutter to be expanded.

It is desirable that the variation of the transparency in the first area described above is enabled by varying at least one of the magnitude and frequency of the voltage applied across the pair of the first electrodes. Controlling the applied voltage or frequency in this way allows the transparency of the liquid crystal shutter to be varied with relative ease.

It is also desirable that the display device further includes a touch panel which is placed between the above-described liquid crystal shutter and the displaying unit and has a transparent area corresponding to the first area. Even when such a touch panel is provided and an area including circuitry located around the transparent area of the touch panel is to be shielded, the entire surface of the liquid crystal shutter, when it is not active, can be made a uniform color.

It is desirable that the display operation is started in the following order:
(1) In the liquid crystal shutter, the first area is switched to the transparent state;
(2) Displaying by the liquid crystal display device is started; and
(3) The backlight is turned on.

In this way, when the display operation is started, by initially switching the liquid crystal shutter to the transparent state, almost the same feeling in use can be obtained as that given by a conventional light-shielding resin layer used to shield the perimeter (frame area).

It is also desirable that the display operation is started in the following order:
(1) In the liquid crystal shutter, the first area is switched to the transparent state;
(2) Displaying by the liquid crystal display device is started; and
(3) The backlight is gradually brightened.

In this way, when the display operation is started, by initially switching the liquid crystal shutter to the transparent state and finally gradually brightening the backlight, a fade-in can be realized in which content to be displayed gradually emerges in an apparently uniform and blank section.

Further, it is desirable that the display operation is terminated in the following order:
(1) The backlight is turned off;
(2) The displaying by the liquid crystal display device is terminated; and
(3) In the liquid crystal shutter, the first area is switched to the opaque state.

In this way, when the display operation is terminated, by finally switching the liquid crystal shutter to the opaque state, almost the same feeling in use can be obtained as that given by a conventional light-shielding resin layer used to shield the perimeter (frame area).

It is also desirable that the display operation is terminated in the following order:
(1) The backlight is gradually dimmed;
(2) The displaying by the liquid crystal display device is terminated; and
(3) In the liquid crystal shutter, the first area is switched to the opaque state.

In this way, when the display operation is terminated by initially gradually dimming the backlight and finally switching the liquid crystal shutter to the opaque state, a fade-out can be realized in which displayed content sinks and goes into a blank and uniform state.

DETAILED DESCRIPTION

A display device according to an embodiment of the present invention will now be described with reference to the drawings.

(First Embodiment)

Figure 1:
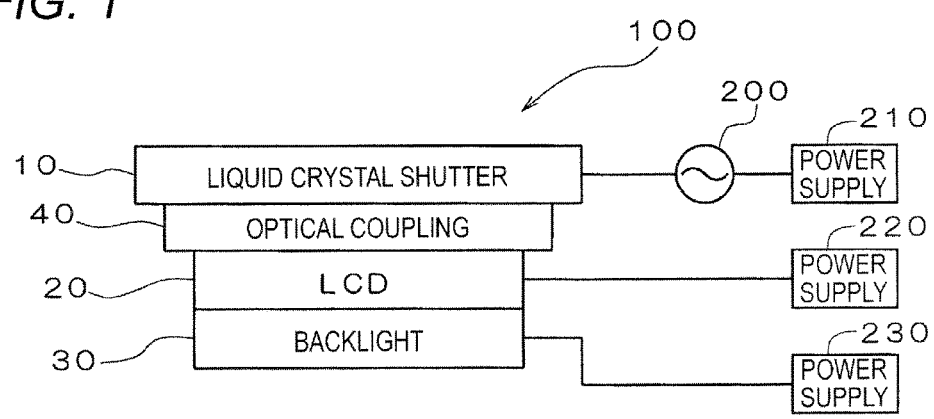
FIG. 1 illustrates the general configuration of a display device according to a first embodiment.

FIG. 1 illustrates the configuration of a display device according to a first embodiment. As shown in FIG. 1, the display device 100 according to this embodiment includes a liquid crystal shutter 10, liquid crystal display device (LCD) 20, backlight 30, and an optical coupling 40.

The liquid crystal shutter 10 is layered on the liquid crystal display device 20 as a displaying unit having a display area and its surrounding hidden area, and has a first area corresponding to the display area and a second area corresponding to the hidden area. The optical coupling 40 is used between the liquid crystal shutter 10 and the liquid crystal display device 20 to join them with no optical gap. Further, under the liquid crystal display device 20 (i.e. on the side opposite the liquid crystal shutter 10), the backlight 30 is located. A power supply 220 and a power supply 230 are connected to the liquid crystal display device 20 and the backlight 30, respectively, to apply the voltage required for operation.

Figure 2:
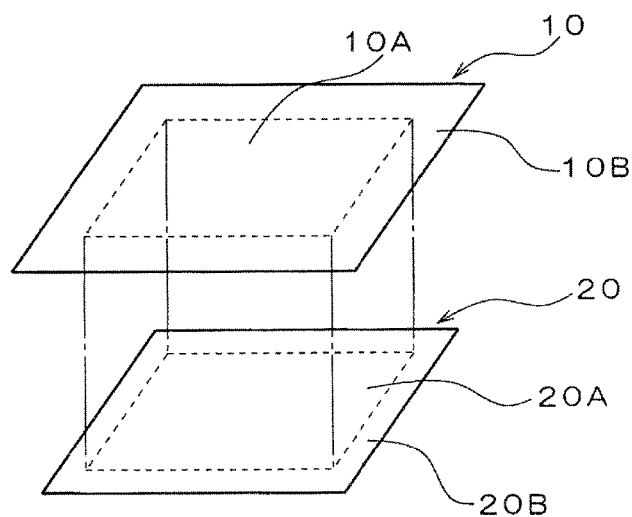
FIG. 2 illustrates the positional relationship between a liquid crystal shutter and a liquid crystal display device.

FIG. 2 illustrates the positional relationship between the liquid crystal shutter 10 and the liquid crystal display device 20. As shown in FIG. 2, the liquid crystal display device 20 includes a display area 20A and a hidden area 20B. The display area 20A is an area capable of displaying various kinds of information using the liquid crystal display device 20. The hidden area 20B is an area that surrounds the display area 20A and includes, for example, a driver that drives electrodes and driving elements included in the display area 20A. This hidden area 20B is blocked from the user of the display device 100 so as to prevent the components inside, such as a driver, from being exposed.

Also, as shown in FIG. 2, the liquid crystal shutter 10 includes a first area 10A, which corresponds to and is of the same size as the display area 20A of the liquid crystal display device 20, and a second area 10B, which corresponds to and is slightly larger than the hidden area 20B. The first area 10A is set to a transparent state when the display area 20A is active (when the liquid crystal display device 20 is operating) and to an opaque state when the display area 20A is not active. The second area 10B is set to an opaque state whether the display area 20A is active or not. These settings are made by a control unit 200 as a controlling unit to which a power supply 210 is connected.

Figure 3:
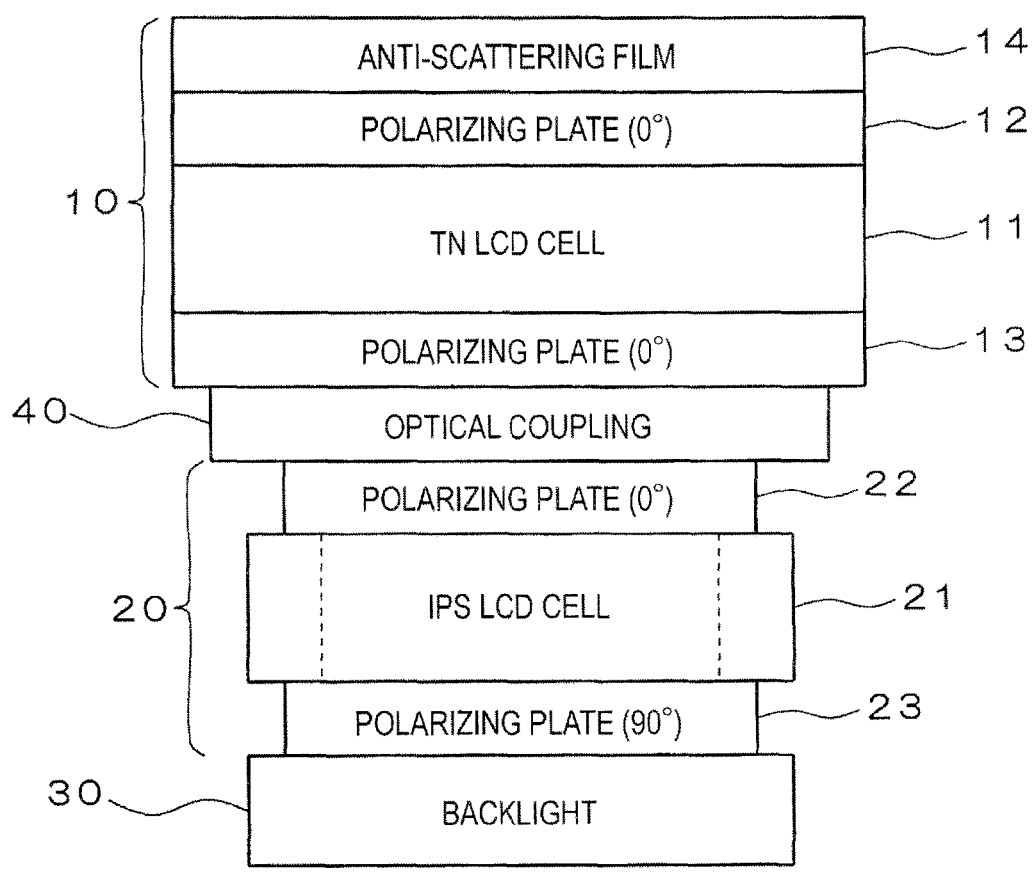
FIG. 3 illustrates the general configuration of the liquid crystal shutter and the liquid crystal display device shown in FIG. 1.

FIG. 3 illustrates a configuration of the liquid crystal shutter 10 and the liquid crystal display device 20 shown in FIG. 1. As shown in FIG. 3, the liquid crystal shutter 10 includes a TN (Twisted Nematic) LCD cell 11, polarizing plates 12 and 13, and an anti-scattering film 14. A pair of polarizing plates 12 and 13 is arranged to sandwich the TN LCD cell 11, and the anti-scattering film 14 is provided on the surface of one of the polarizing plates 12. The surface of the anti-scattering film 14 is over-coated with anti-reflection (AR) and anti-glare (AG) hard-coat (HC). The respective transmission axes of the pair of the polarizing plates 12 and 13 are set at the same angle) (0°). When voltage having predetermined frequency and a predetermined potential difference is applied to the TN LCD cell 11 corresponding to the first area 10A, a liquid crystal within the TN LCD cell 11 corresponding to the first area 10A responds by changing to the transparent state, and the first area 10A of the liquid crystal shutter 10 is brought to the transparent state. When such an applied voltage is removed, the liquid crystal within the TN LCD cell 11 corresponding to the first area 10A returns to an inactive state in which it is opaque, and the first area 10A of the liquid crystal shutter 10 is brought to the opaque state.

Also, as shown in FIG. 3, the liquid crystal display device 20 includes an IPS (In Plane Switching®) LCD cell 21 and polarizing plates 22 and 23. The pair of the polarizing plates 22 and 23 is arranged to sandwich the IPS LCD cell 21. The respective transmission axes of the pair of the polarizing plates 22 and 23 are orthogonal (at an angle of 90°) to each other. For example, the transmission axis of one of the polarizing plates 22 may be set at an angle of 0° which is the same as that of the polarizing plate 13 within the liquid crystal shutter 10, while the transmission axis of the other polarizing plate 23 may be set at an angle of 90°.

Note that although in the above-described example the TN LCD cell 11 is used in the liquid crystal shutter 10, other modes of LCD cells, which allow the first area 10A to be switched between the transparent and opaque states, may also be used. Similarly, although the IPS LCD cell 21 is used in the liquid crystal display device 20, according to this embodiment, other modes of LCD cells or other types of display devices, which allow various kinds of information to be displayed on the display area 20A, may also be used.

Figure 4:
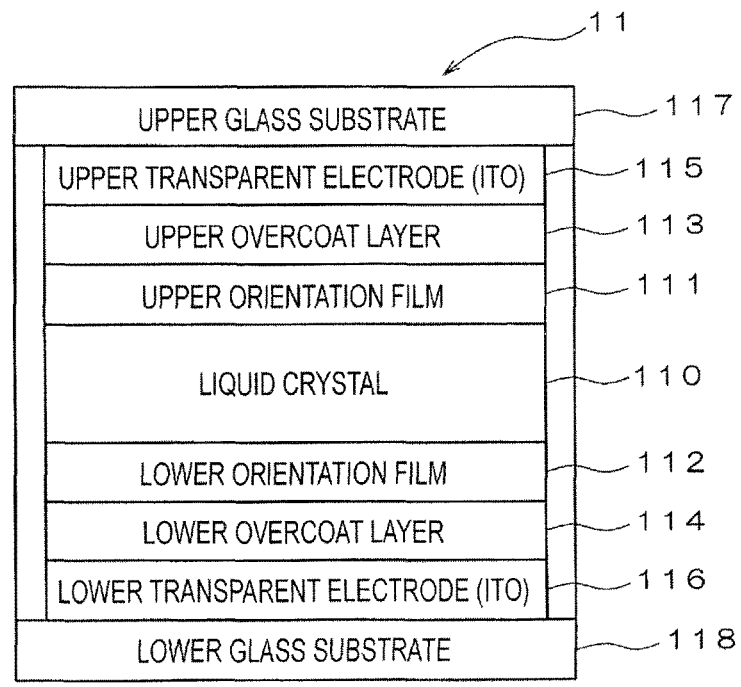
FIG. 4 illustrates the detailed configuration of a TN LCD cell.

FIG. 4 illustrates the detailed configuration of the TN LCD cell 11. As shown in FIG. 4, the TN LCD cell 11 includes a liquid crystal 110, an upper orientation film 111 and a lower orientation film 112 arranged to sandwich the liquid crystal 110, an upper overcoat layer 113 and a lower overcoat layer 114 arranged to sandwich the upper orientation film 111 and the lower orientation film 112, an upper transparent electrode 115 and a lower transparent electrode 116 arranged to sandwich the upper overcoat layer 113 and the lower overcoat layer 114, and an upper glass substrate 117 and a lower glass substrate 118 arranged to sandwich the upper transparent electrode 115 and the lower transparent electrode 116.

Figure 5:
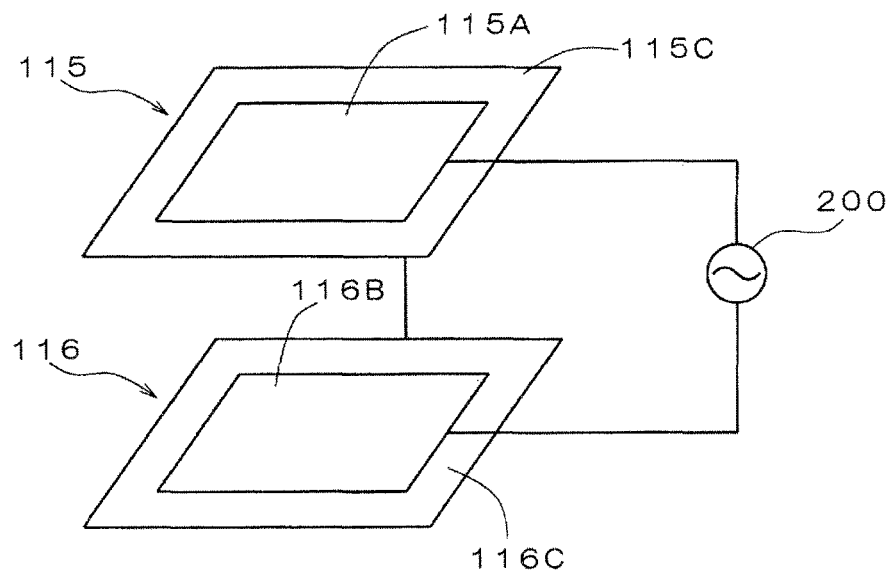
FIG. 5 illustrates a basic configuration of an upper transparent electrode and a lower transparent electrode.

FIG. 5 illustrates a basic configuration of the upper transparent electrode 115 and the lower transparent electrode 116. Each of the upper transparent electrode 115 and the lower transparent electrode 116 is made of, for example, an Indium Tin Oxide (ITO) film.

The upper transparent electrode 115 includes a first electrode 115A corresponding to the first area 10A of the liquid crystal shutter 10 and a second electrode 115C corresponding to the second area 10B. Similarly, the lower transparent electrode 116 includes a first electrode 116B corresponding to the first area 10A of the liquid crystal shutter 10 and a second electrode 116C corresponding to the second area 10B. Across the pair of the first electrodes 115A and 116B, voltage at the same potential and voltage having a predetermined frequency and a predetermined potential difference are selectively applied by the control unit 200. When the voltage having the predetermined frequency and the predetermined potential difference is applied, the liquid crystal 110 sandwiched between the pair of the first electrodes 115A and 116B responds by switching to the transparent state. When such an applied voltage is removed and the voltage at the same potential is applied, the liquid crystal 110 sandwiched between the pair of first electrodes 115A and 116B becomes inactive and switches to the opaque state. In contrast, since the voltage at the same potential is always applied across the other pair of the second electrodes 115C and 116C, the liquid crystal 110 sandwiched between the pair of the second electrodes 115C and 116C does not respond and remains in the opaque state.

Further, although the upper overcoat layer 113 is located between the upper transparent electrode 115, which includes the first electrode 115A and the second electrode 115C, and the upper orientation film 111, the upper overcoat layer 113 is also formed to fill a gap between the first electrode 115A and the second electrode 115C (a gap necessary to keep the electrodes electrically isolated). It is intended that the use of the upper overcoat layer 113 reduces a level difference or a difference in optical properties between where the first electrode 115A or the second electrode 115C is provided and where it is not provided. For example, the upper overcoat layer 113 may be made of a material combining polyimide and epoxy.

Similarly, although the lower overcoat layer 114 is located between the lower transparent electrode 116, which includes the first electrode 116B and the second electrode 116C, and the lower orientation film 112, the lower overcoat layer 114 is also formed to fill a gap between the first electrode 116B and the second electrode 116C. It is intended that the use of the lower overcoat layer 114 reduces a level difference or a difference in optical properties between where the first electrode 116B or the second electrode 116C is provided and where it is not provided. For example, the lower overcoat layer 114 may be made of a material combining polyimide and epoxy.

With reference to FIG. 5, it can be seen that in the basic configuration connecting lines for applying voltage from the control unit 200 to the first electrodes 115A and 116B intersect with the second electrodes 115C and 116C, which is undesirable.

Figure 6:
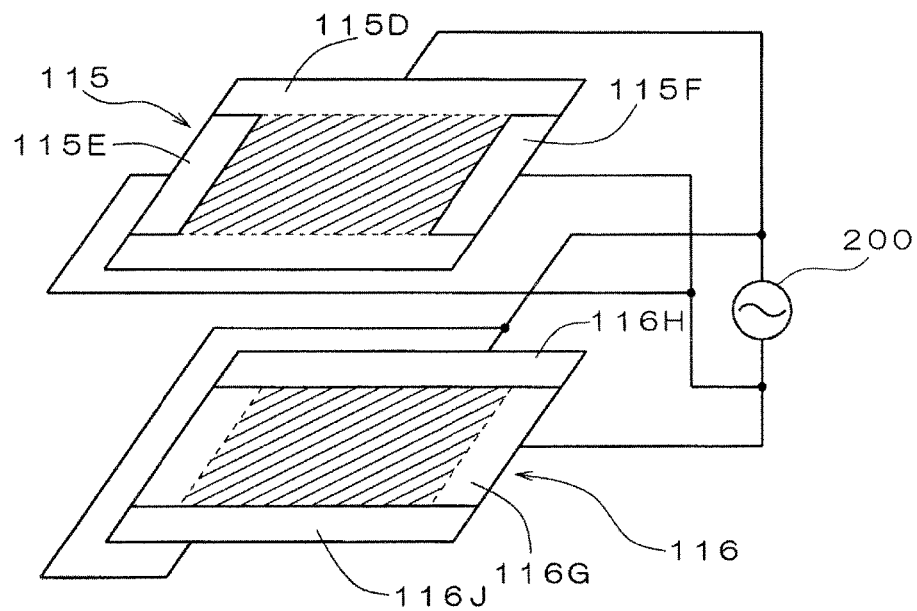
FIG. 6 illustrates a variation of the configuration of the upper transparent electrode and the lower transparent electrode arranged to avoid intersection of connecting lines with the electrodes.

FIG. 6 illustrates a variation of the configuration of the upper transparent electrode 115 and the lower transparent electrode 116 arranged to avoid intersection of connecting lines with the electrodes. As shown in FIG. 6, the upper transparent electrode 115 includes an H-shaped electrode 115D and two rectangular electrodes 115E and 115F. Predetermined gaps are formed between these three electrodes 115D, 115E and 115F, to keep them electrically isolated. The lower transparent electrode 116 includes three rectangular electrodes 116G, 116H and 116J. Predetermined gaps are formed between these three electrodes 116G, 116H and 116J to keep them electrically isolated.

In the upper transparent electrode 115 and the lower transparent electrode 116 configured as described above, the electrode 115D included in the upper transparent electrode 115 and the electrodes 116H and 116J included in the lower transparent electrode 116 are all connected to a first output terminal of the control unit 200. The electrodes 115E and 115F included in the upper transparent electrode 115 and the electrode 116G included in the lower transparent electrode 116 are all connected to a second output terminal of the control unit 200.

The voltage having the predetermined frequency and the predetermined potential difference output from the control unit 200 is applied only to the hatched areas in the upper transparent electrode 115 and the lower transparent electrode 116, and the voltage at the same potential is applied to the remaining areas. Accordingly, the hatched areas in the upper transparent electrode 115 and the lower transparent electrode 116 can be used as the first electrodes 115A and 116B (FIG. 5), and the other areas can be used as the second electrodes 115C and 116C (FIG. 5). Furthermore, the connecting lines between each of the upper transparent electrode 115 and the lower transparent electrode 116 and the control unit 200 can be drawn from the edges of the upper transparent electrode 115 and the lower transparent electrode 116.

In this way, in the display device 100 according to this embodiment, since the liquid crystal shutter 10 is layered on the liquid crystal display device 20 and switches between the transparent and opaque states in conjunction with the display area 20A of the liquid crystal display device 20, the color of the display area 20A in the opaque state can be exactly matched with that of the hidden area 20B in the opaque state.

Furthermore, when the liquid crystal display device 20 is used as the displaying unit, the front surface of the liquid crystal shutter 10, including a section for shielding an area under which a driving circuit of the liquid crystal display device 20 is located (hidden area 20B), can be made a uniform color with no boundary.

Further, since the first or second electrodes (FIGS. 5 and 6) are located all over the liquid crystal shutter 10, the first and second areas 10A and 10B may be configured to have the same structure, and can give a uniform appearance, for example, in the way they reflect light, when viewed from outside.

Additionally, by forming the upper overcoat layer 113 or the lower overcoat layer 114 to fill the gaps between each of the upper orientation film 111 and the lower orientation film 112 and the first and second electrodes, as well as between the first electrodes and the second electrodes, respectively, a level difference between where the first electrodes or the second electrodes are provided and where they are not provided can be reduced, and the optical structure of the upper transparent electrode 115, the lower transparent electrode 116, and their perimeters can be made completely uniform.

Further, the liquid crystal shutter 10 includes the pair of the polarizing plates 12 and 13 (FIG. 3) arranged to sandwich the pair of the transparent electrodes 115 and 116 (FIG. 4), and the respective transmission axes of the pair of the polarizing plates 12 and 13 are set at the same angle. This enables the liquid crystal shutter 10 to switch between the transparent and opaque states by applying voltage on the liquid crystal 110 (FIG. 4).

In the following, by way of example, start and termination procedures of the operation of the display device 100 will be described.

(Basic Start Procedure)

After the display device 100 is turned on, the display operation is started in the following order:

(1) In the liquid crystal shutter 10, the first area 10A (FIG. 2) is switched to the transparent state;

(2) Displaying by the liquid crystal display device 20 is started; and (3) The backlight 30 is turned on. Note that this series of starting steps is controlled by a controller, not shown in the figure, that directs the timing of the respective steps. This applies to other procedures described below as well.

In this way, when the display operation is started, by initially switching the liquid crystal shutter 10 to the transparent state, almost the same feeling in use can be obtained as that given by a conventional light-shielding resin layer used to shield the perimeter (frame area).

(Basic Termination Procedure)

Before the display device 100 is turned off, the display operation is terminated in the following order:

(1) The backlight 30 is turned off;

(2) The displaying by the liquid crystal display device 20 is terminated; and (3) In the liquid crystal shutter 10, the first area 10A (FIG. 2) is switched to the opaque state.

In this way, when the display operation is terminated, by finally switching the liquid crystal shutter 10 to the opaque state, almost the same feeling in use can be obtained as that given by a conventional light-shielding resin layer used to shield the perimeter (frame area).

(Start Procedure for Fade-in)

After the display device 100 is turned on, the display operation is started in the following order:

(1) In the liquid crystal shutter 10, the first area 10A (FIG. 2) is switched to the transparent state;

(2) Displaying by the liquid crystal display device 20 is started; and (3) The backlight 30 is gradually brightened.

Figure 7:
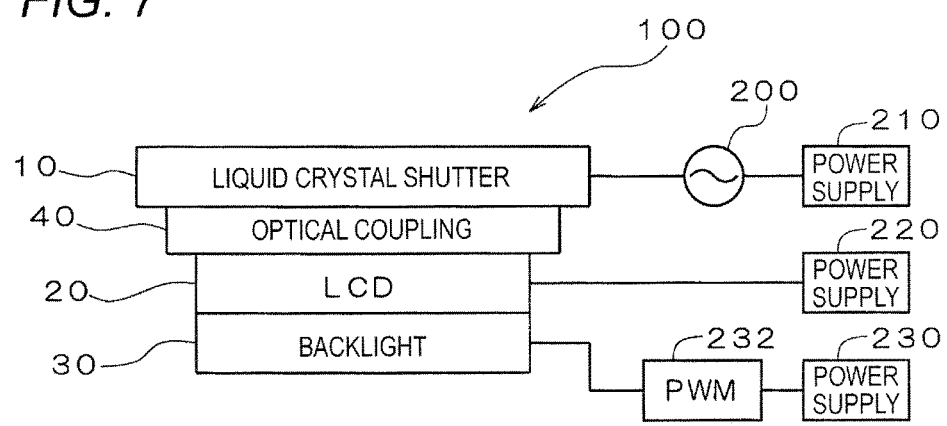
FIG. 7 illustrates a variation in which a backlight is gradually brightened.

FIG. 7 illustrates a variation in which the backlight 30 is gradually brightened. In the configuration shown in FIG. 7, a PWM circuit 232 is added to the configuration shown in FIG. 1 between the power supply 230 and the backlight 30. For example, the PWM circuit 232 generates a PWM driving signal to turn on/off the backlight 30 and the backlight 30 can be gradually brightened by gradually increasing the on-duty of the PWM driving signal.

In this way, when the display operation is started, by initially switching the liquid crystal shutter 10 to the transparent state, and finally gradually brightening the backlight 30, a fade-in can be realized in which content to be displayed gradually emerges in an apparently uniform and blank section.

(Termination Procedure for Fade-Out)

Before the display device 100 is turned off, the display operation is terminated in the following order:

(1) The backlight 30 is gradually dimmed. For example, the backlight 30 can be gradually dimmed by gradually reducing the on-duty of the PWM driving signal by the PWM circuit 232 shown in FIG. 7;

(2) The displaying by the liquid crystal display device 20 is terminated; and (3) In the liquid crystal shutter 10, the first area 10A (FIG. 2) is switched to the opaque state.

In this way, when the display operation is terminated, by initially gradually dimming the backlight 30 and finally switching the liquid crystal shutter 10 to the opaque state, a fade-out can be realized in which displayed content sinks and goes into a blank and uniform state.

(Second Embodiment)

Although in the above-described embodiment the entire display area 20A of the liquid crystal display device 20 has been described as starting its display operation as a unit and then terminating the display operation, the present invention can still be applied to a case where a display area 20A is divided into a plurality of division areas and display operation is started/terminated for each division area, by combining a liquid crystal shutter 10 with a liquid crystal display device 20.

Figure 8:
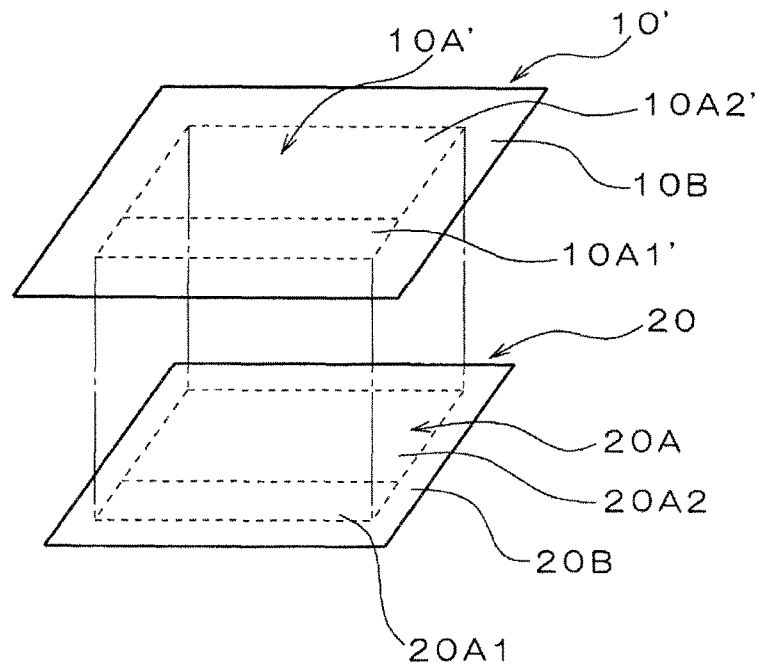
FIG. 8 illustrates the positional relationship between a liquid crystal shutter and a liquid crystal display device according to a second embodiment.

FIG. 8 illustrates the positional relationship between a liquid crystal shutter 10' and a liquid crystal display device 20 according to a second embodiment. As shown in FIG. 8, the liquid crystal display device 20 includes a display area 20A and a hidden area 20B. The display area 20A is an area capable of displaying various kinds of information using the liquid crystal display device 20. It is assumed that in this embodiment the liquid crystal display device 20 is capable of switching between using the display area 20A as a whole and using part of the display area 20A for displaying various kinds of information as appropriate.

For example, consider a liquid crystal display device 20 having a display area 20A divided into two division areas 20A1 and 20A2 and integrated into a vehicle-mounted head unit. It may be possible to use one division area 20A1 to display vehicle interior temperature and operating conditions of an air conditioner, and the other division area 20A2 to display operating conditions of other components such as an audio device. In this case, the one division area 20A1 is always active for displaying as long as the key switch of the vehicle is on. On the other hand, the other division area 20A2 becomes active for displaying only when the components such as an audio device are in use, and remains inactive (for example, a black screen appears so as not to show any information to a user) when they are not in use. Note that, although in this example the one division area 20A1 is configured to be always active for displaying, the one division area 20A1 may also be configured to switch between the active and inactive states for displaying as with the other division area 20A2.

The hidden area 20B is an area that surrounds the display area 20A and includes, for example, a driver that drives electrodes and driving elements included in the display area 20A. This hidden area 20B is blocked from the user of the display device 100 so as to prevent the components inside, such as a driver, from being exposed. Note that this liquid crystal display device 20 may be the same as the liquid crystal display device 20 shown in FIG. 2, described in the first embodiment.

Also, as shown in FIG. 8, the liquid crystal shutter 10' includes a first area 10A', which corresponds to and is of the same size as the display area 20A of the liquid crystal display device 20, and a second area 10B, which corresponds to and is slightly larger than the hidden area 20B. Further, the first area 10A consists of two division areas 10A1' and 10A2'. The two division areas 10A1' and 10A2' constituting the first area 10A' oppose the two division areas 20A1 and 20A2 of the display area 20A, respectively, and are set to the transparent state when the opposing two division areas 20A1 and 20A2 are active for displaying and to the opaque state when they are not, respectively. The second area 10B is always set to the opaque state whether the two division areas 20A1 and 20A2 of the display area 20A are active or not. These settings are made by a control unit 200 (FIG. 1) as a controlling unit to which a power supply 210 is connected.

Figure 9:
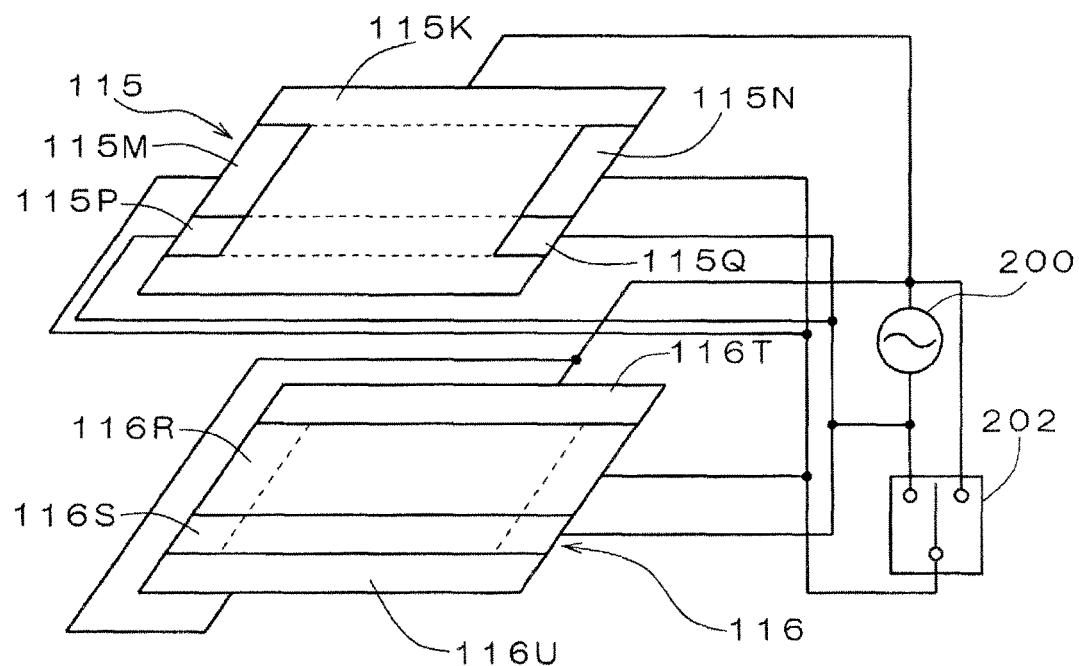
FIG. 9 illustrates the configuration of an upper transparent electrode and a lower transparent electrode arranged to avoid intersection of connecting lines with the electrodes according to the second embodiment.

FIG. 9 illustrates the configuration of an upper transparent electrode 115 and a lower transparent electrode 116 arranged to avoid intersection of connecting lines with the electrodes according to the second embodiment.

The configuration shown in FIG. 9 corresponds to the configuration according to the first embodiment described above using FIG. 6, and therefore, as for its overall structure including a liquid crystal shutter 10 and a TN LCD cell 11, the structure shown in FIGS. 3 and 4 may be used as is.

As shown in FIG. 9, the upper transparent electrode 115 includes an H-shaped electrode 115K and four rectangular electrodes 115M, 115N, 115P and 115Q. Predetermined gaps are formed between these five electrodes 115K, 115M, 115N, 115P and 115Q to keep them electrically isolated. The lower transparent electrode 116 includes four rectangular electrodes 116R, 116S, 116T and 116U. Predetermined gaps are formed between these four electrodes 116R, 116S, 116T and 116U to keep them electrically isolated.

In the upper transparent electrode 115 and the lower transparent electrode 116 configured as described above, the electrode 115K included in the upper transparent electrode 115 and the electrodes 116T and 116U included in the lower transparent electrode 116 are all connected to a first output terminal of the control unit 200. The electrodes 115P and 115Q included in the upper transparent electrode 115 and the electrode 116S included in the lower transparent electrode 116 are all connected to a second output terminal of the control unit 200. Further, the electrodes 115M and 115N included in the upper transparent electrode 115 and the electrode 116R included in the lower transparent electrode 116 are all connected via a switch 202 to either one of the first and second output terminals of the control unit 200.

(A Case Where Both of Two Division Areas 20A1 and 20A2 of Display Area 20A is Activated for Displaying)

Figure 10:
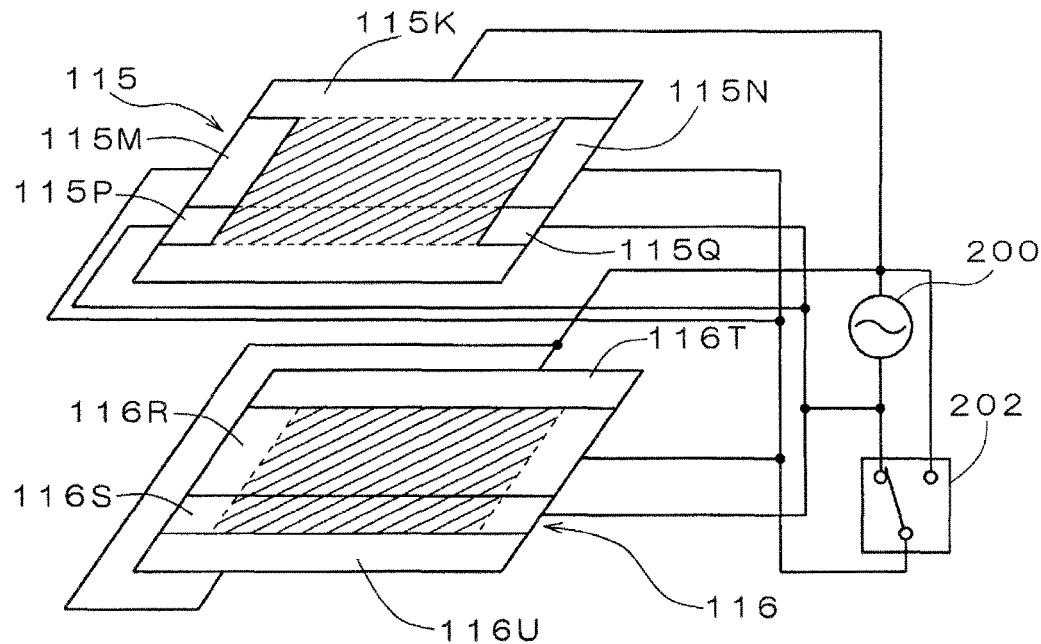
FIG. 10 illustrates a case where display operation is performed using an entire display area.

The control unit 200 is activated and the electrodes 115M and 115N included in the upper transparent electrode 115 and the electrode 116R included in the lower transparent electrode 116 are connected to the second output terminal of the control unit 200 through the switch 202. In this case, voltage having a predetermined frequency and a predetermined potential difference output from the control unit 200 is applied to hatched areas in the upper transparent electrode 115 and the lower transparent electrode 116 (both of the division areas 10A1' and 10A2') shown in FIG. 10, and voltage at the same potential is applied to the remaining areas. Accordingly, information displayed on each of the two division areas 20A1 and 20A2 of the display area 20A is allowed to pass through the liquid crystal shutter 10.

(A Case Where One Division Area 20A1 of Display Area 20A is Activated for Displaying and the Other Division Area 20A2 is Not Activated)

Figure 11:
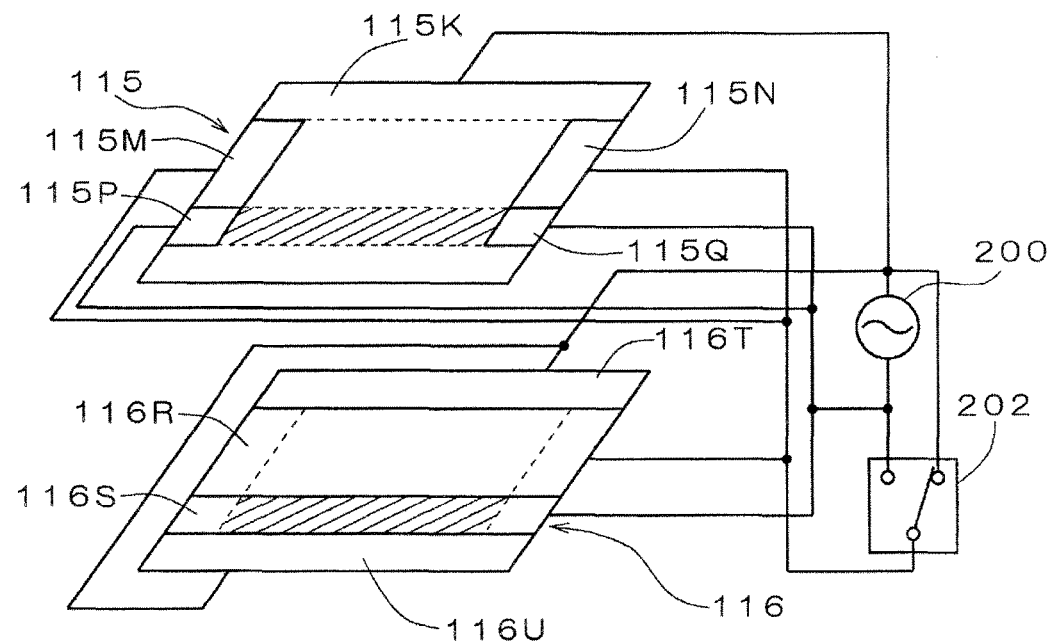
FIG. 11 illustrates a case where display operation is performed using part of the display area.

The control unit 200 is activated and the electrodes 115M and 115N included in the upper transparent electrode 115 and the electrode 116R included in the lower transparent electrode 116 are connected to the first output terminal of the control unit 200 through the switch 202. In this case, the voltage having the predetermined frequency and the predetermined potential difference output from the control unit 200 is applied to hatched areas in the upper transparent electrode 115 and the lower transparent electrode 116 (division areas 10A1' only) shown in FIG. 11, and voltage at the same potential is applied to the remaining areas. Accordingly, information displayed on one of the division areas 20A1 of the display area 20A only is allowed to pass through the liquid crystal shutter 10.

(A Case Where Both Division Areas 20A1 and 20A2 of Display Area 20A Are Not Activated)

The control unit 200 is stopped (both of the output terminals are set at the same potential) and the electrodes 115M and 115N included in the upper transparent electrode 115 and the electrode 116R included in the lower transparent electrode 116 are connected to the second output terminal (or may be connected to the first output terminal as well) of the control unit 200 through the switch 202. In this case, since all the electrodes included in the upper transparent electrode 115 and the lower transparent electrode 116 included in the liquid crystal shutter 10 are at the same potential, the entire liquid crystal shutter 10 can be brought to the opaque state.

In this way, according to this embodiment, since a plurality of pairs (for example, two pairs) of first electrodes (electrodes corresponding to the two division areas 10A1' and 10A2') and a pair of second electrodes (electrodes corresponding to the hidden area 20B) are provided all over the liquid crystal shutter 10', the first and second areas may be configured to have the same structure, and can give a uniform appearance, for example, in the way they reflect light, when viewed from outside. Furthermore, since two types of voltage (voltage at the same potential and voltage having a predetermined frequency and a predetermined potential difference) may be selectively applied across the plurality of the pairs of the first electrodes and the pair of the second electrodes, respectively, the need for providing a control unit 200 configured to apply these voltages to correspond to each of the plurality of the pairs of the first electrodes and the pair of the second electrodes is eliminated, thereby enabling a simplified configuration.

Figure 12:
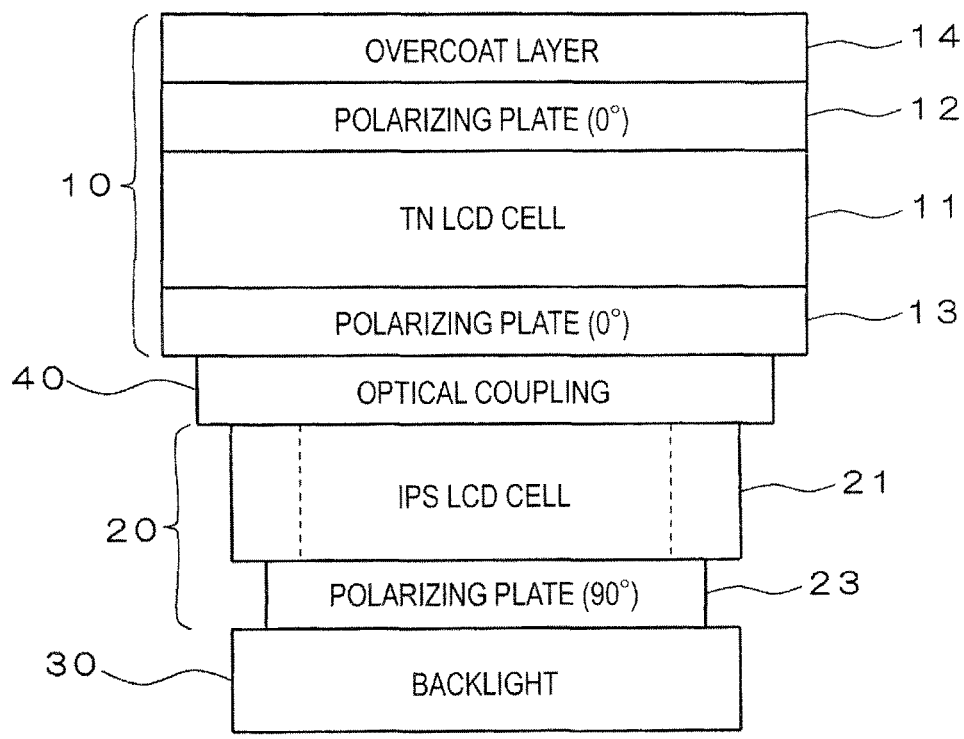
FIG. 12 illustrates a variation of the display device in which one of the polarizing plates is omitted.

It should be noted that the present invention is not limited to the embodiments described herein, and various modifications and variations thereof are possible within the spirit and scope of the present invention. For example, in the configuration shown in FIG. 3, two polarizing plates 13 and 22 are placed to sandwich the optical coupling 40. The transmission axes of these two polarizing plates 13 and 22 are both set at 0° and the same, and therefore, either one of the polarizing plates may be omitted. For example, as shown in FIG. 12, of the pair of the polarizing plates 12 and 13 included in the liquid crystal shutter 10, one polarizing plate 13, which is located on the side near the liquid crystal display device 20, may be concurrently used as one polarizing plate 22 located on the side near the liquid crystal shutter 10 of the pair of the polarizing plates 22 and 23 included in the liquid crystal display device 20, and thus the polarizing plate 22 may be omitted. Thus the number of parts can be reduced by sharing a polarizing plate, which would otherwise be provided individually for the liquid crystal shutter 10 and the liquid crystal display device 20, separately. Furthermore, reducing the number of polarizing plates by one can increase the transmittance.

Further, although according to the above-described embodiment the first area 10A of the liquid crystal shutter 10 is divided into different areas to be used in the transparent state and the opaque state, it may also be possible to vary the degree of transparency of the first area 10A. This enables the total dimming ratio in a combination of the liquid crystal display device 20 and the liquid crystal shutter 10 to be expanded.

For example, the variation of the degree of transparency of the first area 10A may be enabled by varying at least one of the magnitude and frequency of the voltage applied across the pair of the first electrodes 115A and 116B (FIG. 5) from the control unit 200. Controlling the applied voltage or frequency in this way allows the transparency of the liquid crystal shutter 10 to be varied with relative ease.

It may also be possible that a touch panel is provided between the liquid crystal shutter 10 and the liquid crystal display device 20 in such a way that the transparent area (detection area) of the touch panel corresponds to the first area 10A of the liquid crystal shutter 10. For example, in the example shown in FIG. 3, a touch panel may be provided between the polarizing plates 12 and 13 and the TN LCD cell 11, or between the polarizing plate 13 and the optical coupling 40.

Figure 13:
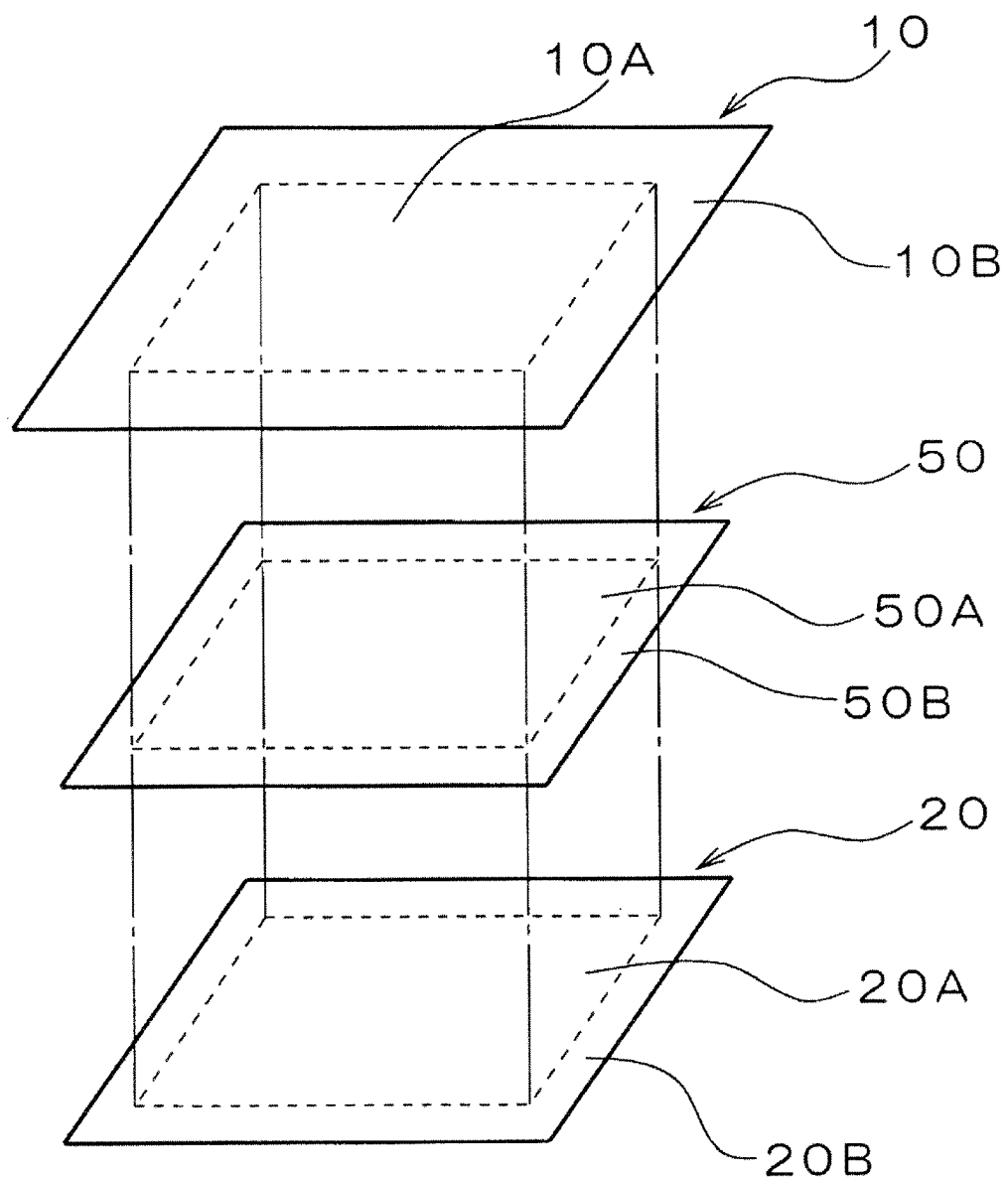
FIG. 13 illustrates the positional relationship between a touch panel, a liquid crystal shutter, and a liquid crystal display device.

FIG. 13 illustrates the positional relationship between a touch panel, a liquid crystal shutter 10, and a liquid crystal display device 20. As shown in FIG. 13, the display area 20A of the liquid crystal display device 20, the first area 10A of the liquid crystal shutter 10, and the transparent area (detection area) 50A of the touch panel 50 correspond to one another. The touch panel 50 has an area 50B around the transparent area 50A, and the area 50B includes, for example, a position detection circuit and wiring extending from a transparent electrode included in the transparent area 50A when the touch panel 50 is of a capacitive type. Even when this area 50B is to be shielded, the entire liquid crystal shutter 10 can be made a uniform color when the display section is not active.

Further, although according to the second embodiment described above the display area 20A of the liquid crystal display device 20 and the first area 10A' of the liquid crystal shutter 10' are divided into two division areas, these areas may also be divided into three or more division areas.

As described herein, according to the present invention, since a liquid crystal shutter is layered on a displaying unit and switches between a transparent and opaque states in conjunction with a display area of the displaying unit, the color of the display area in the opaque state can be exactly matched with that of the hidden area in the opaque state.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device comprising:
   a displaying unit that has a display area and a hidden area surrounding the display area;
   a liquid crystal shutter that is layered on the displaying unit in the direction of viewing by a user and has a first area corresponding to the display area and a second area corresponding to the hidden area; and
   a controlling unit that sets the first area and the second area to a transparent state and an opaque state, respectively, when the display area is active, and sets the first area and the second area to the opaque state when the display area is not active to give a uniform appearance when viewed from outside;
   wherein
   the liquid crystal shutter includes a liquid crystal, a pair of orientation films arranged to sandwich the liquid crystal, and a pair of transparent electrodes arranged to sandwich the pair of orientation films;
   the pair of transparent electrodes includes a pair of first electrodes corresponding to the first area and a pair of second electrodes corresponding to the second area;
   voltage at the same potential and voltage having a predetermined frequency and a predetermined potential difference are selectively applied across the pair of first electrodes; and
   the voltage at the same potential is always applied across the pair of second electrodes.

2. The display device according to claim 1, wherein overcoat layers are formed between the orientation films and the first and second electrodes, as well as between the first electrodes and the second electrodes.

3. The display device according to claim 2, wherein a level difference and a difference in optical properties between where the first or second electrodes are provided and where they are not provided are reduced by using the overcoat layers.

4. The display device according to claim 1, wherein the liquid crystal shutter further includes a pair of polarizing plates arranged to sandwich the pair of transparent electrodes, and both of the pair of polarizing plates have a transmission axis at the same angle.

5. The display device according to claim 4, wherein the displaying unit is a liquid crystal display device; and one of the pair of polarizing plates, which is located on the side near the liquid crystal display device, is concurrently used as one of another pair of polarizing plates included in the liquid crystal display device, which is located on the side near the liquid crystal shutter.

6. The display device according to claim 1, wherein the displaying unit is a liquid crystal display device; a backlight is included in the liquid crystal display device; and transparency of the first area is variable.

7. The display device according to claim 6, wherein the variation of the transparency of the first area is enabled by varying at least one of the magnitude and frequency of the voltage applied across the pair of first electrodes.

8. The display device according to claim 6, wherein display operation is started in the following order:
   (1) in the liquid crystal shutter, the first area is switched to the transparent state;
   (2) displaying by the liquid crystal display device is started; and
   (3) the backlight is turned on.

9. The display device according to claim 6, wherein display operation is started in the following order:
   (1) in the liquid crystal shutter, the first area is switched to the transparent state;
   (2) displaying by the liquid crystal display device is started; and
   (3) the backlight is gradually brightened.

10. The display device according to claim 6, wherein display operation is terminated in the following order:
    (1) the backlight is turned off;
    (2) displaying by the liquid crystal display device is terminated; and
    (3) in the liquid crystal shutter, the first area is switched to the opaque state.

11. The display device according to claim 6, wherein display operation is terminated in the following order:
    (1) the backlight is gradually dimmed;
    (2) displaying by the liquid crystal display device is terminated; and
    (3) in the liquid crystal shutter, the first area is switched to the opaque state.

12. The display device according to claim 1, wherein the first area included in the liquid crystal shutter is divided into a plurality of division areas; and the controlling unit sets each of the plurality of division areas separately to the transparent state or the opaque state.

13. The display device according to claim 12, wherein each of the plurality of division areas is able to be set separately to the transparent state or the opaque state regardless of the operating state of the display area.

14. A display device comprising:
    a displaying unit that has a display area and a hidden area surrounding the display area;
    a liquid crystal shutter that is layered on the displaying unit and has a first area corresponding to the display area and a second area corresponding to the hidden area; and
    a controlling unit that sets the first area and the second area to a transparent state and an opaque state, respectively, when the display area is active, and sets the first area and the second area to the opaque state when the display area is not active; wherein
    the first area included in the liquid crystal shutter is divided into a plurality of division areas;
    the controlling unit sets each of the plurality of division areas separately to the transparent state or the opaque state;
    the liquid crystal shutter includes a liquid crystal, a pair of orientation films arranged to sandwich the liquid crystal, and a pair of transparent electrodes arranged to sandwich the pair of orientation films;

the pair of transparent electrodes includes a plurality of pairs of first electrodes respectively corresponding to the plurality of division areas included in the first area and a pair of second electrodes corresponding to the second area;

voltage at the same potential and voltage having a predetermined frequency and a predetermined potential difference are selectively and separately applied across each of the plurality of the pairs of first electrodes; and the voltage at the same potential is always applied across the pair of second electrodes.

15. A display device comprising:

a displaying unit that has a display area and a hidden area surrounding the display area;

a liquid crystal shutter that is layered on the displaying unit in the direction of viewing by a user and has a first area corresponding to the display area and a second area corresponding to the hidden area; and a controlling unit that sets the first area and the second area to a transparent state and an opaque state, respectively, when the display area is active, and sets the first area and the second area to the opaque state when the display area is not active to give a uniform appearance when viewed from outside;

wherein a touch panel is placed between the liquid crystal shutter and the displaying unit and has a transparent area corresponding to the first area; and wherein the liquid crystal shutter includes a liquid crystal, a pair of orientation films arranged to sandwich the liquid crystal, and a pair of transparent electrodes arranged to sandwich the pair of orientation films;

the pair of transparent electrodes includes a pair of first electrodes corresponding to the first area and a pair of second electrodes corresponding to the second area;

voltage at the same potential and voltage having a predetermined frequency and a predetermined potential difference are selectively applied across the pair of first electrodes; and the voltage at the same potential is always applied across the pair of second electrodes.

* * * * *